Figure 1:
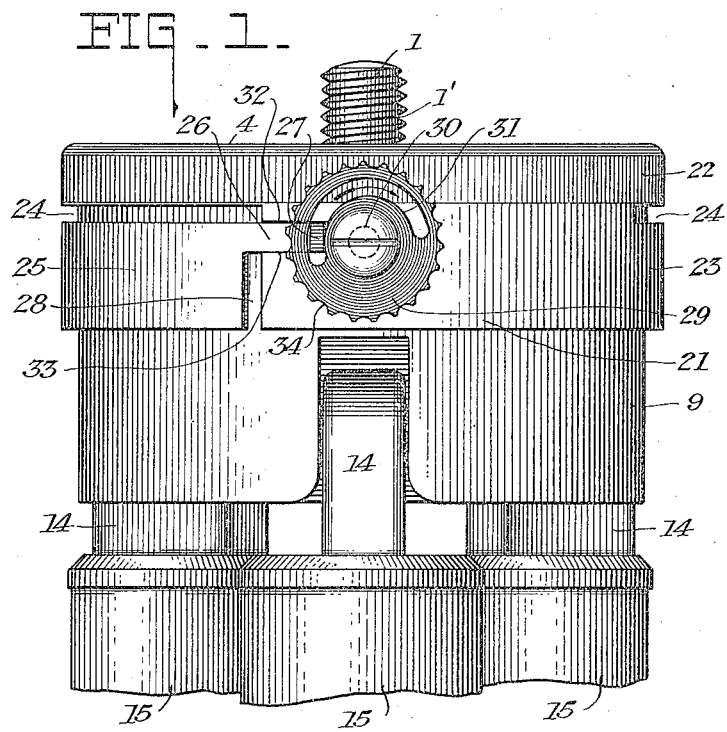

W. C. VAETH.
LOCK FOR TRIPOD HEADS.
APPLICATION FILED DEC. 24, 1920.

1,386,664. Patented Aug. 9, 1921.

WITNESSES:

INVENTOR
William C. Vaeth,
BY
ATTORNEYS.

UNITED STATES PATENT OFFICE.

WILLIAM C. VAETH, OF ROCHESTER, NEW YORK, ASSIGNOR TO EASTMAN KODAK COMPANY, OF ROCHESTER, NEW YORK, A CORPORATION OF NEW YORK.

LOCK FOR TRIPOD-HEADS.

1,386,664.   Specification of Letters Patent.   Patented Aug. 9, 1921.

Application filed December 24, 1920. Serial No. 433,047.

*To all whom it may concern:*

Be it known that I, WILLIAM C. VAETH, a citizen of the United States of America, residing at Rochester, in the county of Monroe and State of New York, have invented certain new and useful Improvements in Locks for Tripod-Heads, of which the following is a full, clear, and exact specification.

This invention relates to photography and more particularly to tripods for supporting photographic cameras. One object of my invention is to provide a locking mechanism for a revoluble tripod head, so that it can be easily and quickly fastened in any desired position relative to the base and supporting legs. A further object is to provide a cam locking device which will actuate a binding collar to secure the head in any position. A still further object is to provide a device of the class described which will lie flat against the tripod, having no projecting parts. A still further object is to provide such a device which will fit into the carrying cases now on the market. Another object is to provide a locking device which can be readily operated when a camera is mounted in position upon the tripod, and still another object is to provide a lock with which tripods now on the market can be equipped by supplying a readily interchangeable part. With these and other objects in view, as will appear hereinafter from the following description, my invention consists in the combination of parts described in the specification and more particularly pointed out in the claims annexed hereto.

Figure 2:
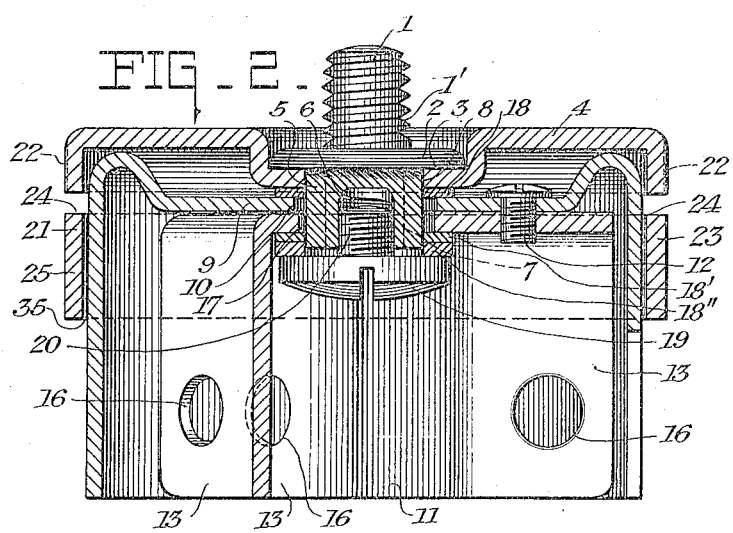

Referring to the drawing, in which like reference characters denote like parts:

Figure 1 shows an elevation of a tripod head equipped with a lock constructed in accordance with, and illustrating, one embodiment of my invention, and Fig. 2 indicates a section through the tripod head shown in Fig. 1, the legs of the tripod being removed.

The camera is fastened to the tripod head by means of a screw 1. As shown in Fig. 2, this part consists of a threaded portion 1', supported upon a flange 2 which rests in a seat 3 formed in the tripod head 4. Extending downwardly from flange 2 is a shank 5 (shown in section) internally threaded at 6. This shank is circular in horizontal cross section, but has one or more flat sides 7, so that it will turn with the head 4, since the aperture 8 in part 4 is cut to closely fit the shape of the shank. A washer 18 spaces the top 4 from a base 9, the latter being centrally apertured at 10. The diameter of this hole is sufficient to allow shank 5 to turn freely therein. A yoke 11 is fastened by screws 12 (only one shown) to base 9, there being three sets of leg supporting lugs 13, forming a part of this yoke. The flattened ends 14 of the legs 15 are fastened in position between the lugs 13 by means of suitable bolts which pass through the holes 16. The aperture 17 in yoke 11 is also of sufficient diameter to allow shank 5 to turn freely therein, so that when washers 18' and 18" space the head 19 of screw 20 from the yoke, the screw 1 and head 4 can be freely revolved while the base 9 and legs 15 remain stationary, as these washers form bearings upon which the head turns.

In order to lock the head 4 against rotation, I provide a friction collar in the following manner: The head 4 has a downwardly extending annular flange 21, provided with a roughened portion 22 for convenience in handling. A portion of base 9 is surrounded by flange 23. A part of this flange 23 is separated from the top by a slot 24 which extends approximately three-quarters around its circumference, leaving a flexible band 25 integral with the head. A tongue 26 is further cut from the metal, and the end turned up at 27 to form a cam engaging lug or protuberance. Some of the metal is cut away at 28 to make a slot extending up from the bottom of the flange which allows clearance for the expansion and contraction of the flexible binding collar 25.

To contract and expand collar 25 there is a cam disk 29 pivoted to the flange 21 by a screw 30. I find it convenient to make this disk out of metal approximately .05 of an inch thick, so it will project only a very little distance from collar 25, being arranged in a plane tangent to the circular head. An arcuate eccentric slot 31 provides a way in which lug 27 rests. To prevent collar 25 from binding along its upper edge by twisting up with the edges of slot 24 contacting, or to prevent other distortion some guideway is necessary. By cutting tongue 26 from the flange, as illustrated, the sides 32 and 33 provide guides in which the tongue travels as the disk is rotated. The periphery of the disk is serrated at 34 for convenience in operating. This serration is particularly useful combined with the cam lock because the compact metal tripods have comparatively small heads, and, when a camera is mounted in place thereon, it is difficult to manipulate a locking nut or screw lying close to the bottom of the camera. With my device, however, the actual movement necessary to bind the head and base together is approximately .031 of an inch, so that in half a turn of the disk the cam acts very gradually and, consequently, very easily. It is, therefore, possible, and generally most convenient, to rotate disk 29 by a sliding pressure of the finger along the bottom edge of the serrations 34. When thus operated, the bottom of the camera is not too close for convenience, while at the same time the locking mechanism projects only a very small distance from the head and will fit in the tripod carrying cases now on the market.

The operation of my locking device is as follows: Turning disk 29 in the direction shown by arrow, Fig. 1, lug 27 is drawn toward screw 30, binding collar 25 upon the outside of base 9, thereby locking the head against movement. Reversing the movement will cause lug 27 to move away from screw 30, allowing the natural spring of the metal band 25 to open to the position shown in Fig. 2, where the clearance shown at 35 permits the top 4 to be freely revolved. In the drawing the scale is slightly exaggerated to show this clearance properly.

This structure makes a simple positive lock with no projecting parts. Moreover where it is desirable to equip tripods of the same type with my locking arrangement, it is only necessary to provide as a separate part the top 4, which with the cam 29 and collar 25 forms a head and locking unit in one part. The purchaser can readily move screw 20 and by replacing the top plate with the locking head 4 reassemble the parts, as the locking device is a unitary plate which can be separately supplied.

Having thus described my invention, what I claim as new and desire to secure by Letters Patent is:

1. In a locking device for tripod heads, the combination with a base, of a tripod head mounted to revolve on the base, and a frictional locking band integral with one of these parts.

2. In a locking device for tripods, the combination with a base, means for supporting the base, of a revoluble head carried by the base, a depending flange upon the head extending over the base, and means carried by the flange for contracting a portion of it into binding engagement with the base, locking the head against rotation.

3. In a locking device for tripod heads, the combination with a base, of a revoluble head mounted upon the base, a binding collar carried by the head, and a cam for moving the binding collar to or from engagement with the base, whereby the revoluble head is locked or released.

4. In a locking device for tripods, the combination with a base, of a revoluble head mounted thereon, a binding collar carried by one of the parts, a rotary cam adapted to actuate the binding collar so as to lock or release the base and head to or from each other.

5. In a locking unit for tripods, the combination with a base, of a head revolubly mounted thereon, a screw for holding the head to the base, and a locking device carried by the head, the head and locking device being removable as a unit by releasing the screw.

6. In a locking device for tripods, the combination with a base, of a head pivoted to the base, a rotatable cam disk pivoted to the head, and means integral with the head and coöperating with the cam disk for locking the head relative to the base.

7. In a locking device for tripods, the combination with a base, of a head pivoted to the base, a binding collar on the head, a protuberance on the collar, a cam for engaging the protuberance by which the collar may be made to lock the head against movement.

8. In a locking device for tripods, the combination with a base, of a head revoluble upon the base, a substantially flat top on the head, a binding collar, and a cam for actuating the binding collar, a guideway for confining the movement of the collar to a path substantially parallel to the top of the head.

9. In a locking device for tripods, the combination with a base, of a head revolubly mounted thereon, a binding collar and an actuating cam therefor, said actuating cam arranged tangentially with respect to the base and head, so as to project therefrom a minimum distance.

10. In a locking device for tripod heads, the combination with a base, of a head revolubly mounted on the base, a flange extending downwardly from the periphery of the head, a flexible binding collar formed from the head by cutting a slot in the flange substantially parallel to the top of the head, and means for contracting and expanding the binding collar, whereby the head and base are locked and released relative to each other.

11. In a locking device for tripod heads, the combination with a base, of a head revolubly mounted on the base, a flange extending downwardly from the periphery of the head, a flexible binding collar formed from the head by cutting a slot in the flange substantially parallel to the top of the head, a slotted cam carried by the head, a portion of the collar engaging the slotted cam, so that by moving the cam the collar would be brought to and from frictional engagement with the base.

12. In a locking device for tripod heads, the combination with a base, of a revolubly mounted head upon the base, means coöperating with the base and head for locking these parts together and an actuating disk for operating said locking means comprising a rotatable disk provided with an arcuate eccentric slot.

Signed at Rochester, New York, this 20th day of December, 1920.

WILLIAM C. VAETH.